US008449668B2

(12) United States Patent
Li et al.

(10) Patent No.: US 8,449,668 B2
(45) Date of Patent: May 28, 2013

(54) METHOD AND COMPOSITION FOR PRIMING WOOD AND NATURAL FIBRES

(75) Inventors: Sheng Li, Wheelers Hill (AU); Wei Dong Yang, Glen Waverley (AU); Wojciech Stanislaw Gutowski, Frankston (AU); Sharon Molenaar, Blackburn South (AU); Mark Spicer, Seaford (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 865 days.

(21) Appl. No.: 12/224,136

(22) PCT Filed: Feb. 20, 2007

(86) PCT No.: PCT/AU2007/000178
§ 371 (c)(1),
(2), (4) Date: Feb. 6, 2009

(87) PCT Pub. No.: WO2007/095670
PCT Pub. Date: Aug. 30, 2007

(65) Prior Publication Data
US 2009/0191354 A1 Jul. 30, 2009

(30) Foreign Application Priority Data
Feb. 20, 2006 (AU) ................................ 2006900824

(51) Int. Cl.
C08J 5/12 (2006.01)
C09D 1/00 (2006.01)
B05D 1/36 (2006.01)
B05D 7/00 (2006.01)

(52) U.S. Cl.
USPC .................. 106/287.3; 106/286.6; 106/286.7; 427/408

(58) Field of Classification Search
USPC .................. 106/287.3, 286.6, 287.7; 427/408
See application file for complete search history.

(56) References Cited

U.S. PATENT DOCUMENTS

| | | | | |
|---|---|---|---|---|
| 3,352,833 A * | 11/1967 | Earle, Jr. | ........................ | 525/430 |
| 3,994,827 A * | 11/1976 | Sakai et al. | .............. | 428/402.22 |
| 4,604,204 A * | 8/1986 | Linder et al. | .................... | 210/490 |
| 4,614,762 A * | 9/1986 | Marans et al. | .................... | 525/61 |
| 4,742,094 A * | 5/1988 | Brothers et al. | ............... | 523/130 |
| 5,079,098 A * | 1/1992 | Liu | ................................ | 428/522 |
| 5,108,889 A * | 4/1992 | Smith et al. | ........................ | 435/4 |
| 5,314,562 A * | 5/1994 | McDonnell et al. | ........... | 156/314 |
| 5,536,370 A * | 7/1996 | Scherr et al. | ................ | 162/164.3 |
| 5,922,161 A * | 7/1999 | Wu et al. | ...................... | 156/272.6 |
| 5,990,224 A * | 11/1999 | Raynolds et al. | ............. | 524/501 |
| 6,176,315 B1 * | 1/2001 | Reddy et al. | .................... | 166/295 |
| 6,323,306 B1 * | 11/2001 | Song et al. | ...................... | 528/342 |
| 6,624,284 B1 * | 9/2003 | Biedermann et al. | ......... | 528/230 |
| 6,673,192 B1 * | 1/2004 | Woods et al. | ................... | 156/314 |
| 7,141,077 B2 * | 11/2006 | Detering et al. | ................... | 8/137 |
| 2002/0010971 A1 * | 1/2002 | Hohener et al. | ................... | 8/536 |
| 2002/0074696 A1 * | 6/2002 | Wu et al. | ........................ | 264/446 |
| 2002/0176973 A1 * | 11/2002 | Keiser | ........................... | 428/212 |
| 2003/0157268 A1 * | 8/2003 | Gutowski et al. | ............. | 427/532 |
| 2003/0185990 A1 * | 10/2003 | Bittner et al. | ................ | 427/385.5 |
| 2003/0194504 A1 * | 10/2003 | Bilyk et al. | .................... | 427/458 |
| 2004/0000523 A1 * | 1/2004 | Rosenberg et al. | ............ | 210/660 |
| 2004/0019000 A1 * | 1/2004 | Manoharan et al. | ............ | 514/44 |
| 2004/0036197 A1 * | 2/2004 | Janiga et al. | ................... | 264/322 |
| 2004/0043157 A1 * | 3/2004 | Gross et al. | ................... | 427/386 |
| 2004/0131788 A1 * | 7/2004 | Hermes | ...................... | 427/385.5 |
| 2005/0048207 A1 * | 3/2005 | Gutowski et al. | ............. | 427/336 |
| 2005/0211621 A1 * | 9/2005 | Wu et al. | ................... | 210/321.86 |
| 2005/0222324 A1 * | 10/2005 | Nakaoka et al. | .............. | 524/589 |
| 2006/0249445 A1 * | 11/2006 | Wu et al. | .................. | 210/500.27 |
| 2006/0278337 A1 * | 12/2006 | Chikatsune et al. | .......... | 156/316 |
| 2007/0298006 A1 * | 12/2007 | Tomalia et al. | ............. | 424/78.03 |
| 2009/0191354 A1 * | 7/2009 | Li et al. | ......................... | 427/475 |

FOREIGN PATENT DOCUMENTS

| | | |
|---|---|---|
| DE | 10 027 638 | 12/2001 |
| EP | 1 609 808 | 12/2005 |
| EP | 1 609 809 | 12/2005 |
| JP | 10-102030 | 4/1998 |
| WO | 02/31222 | 4/2002 |
| WO | 2005/010067 | 3/2005 |

OTHER PUBLICATIONS

Bystrak et al. Langmuir 1999, 15, 3748-3751.*
Takeda et al. Eur. J. Biochem. 130, 383-389, 1983.*
Ibrahim et al. Polym. Plat. Technol. Eng. 36(6), 963-971, 1997.*
Weyts et al. Makromol Chem. Rapid Commun. 10, 299-302, 1989.*
International Search Report for PCT/AU2007/000178, mailed Mar. 22, 2007.
International Preliminary Report on Patentability for PCT/AU2007/000178, dated May 21, 2008.
Derwent Abstract Accession No. 2005-152218/16.
Derwent Abstract Accession No. 2002-148921/20.
Derwent Abstract Accession No. 2002-666757/71.
Derwent Abstract Accession No. 2006-112009/12.
Derwent Abstract Accession No. 2006-059005/07.

* cited by examiner

*Primary Examiner* — Liam Heincer
(74) *Attorney, Agent, or Firm* — Nixon & Vanderhye P.C.

(57) ABSTRACT

This invention relates to a primer composition for wood comprising a waterborne composition comprising polyamine and having a pH of at least 11.5 and a method of improving the bonding of wood with coatings such as electrostatic coatings, and adhesives using the primer.

22 Claims, No Drawings

METHOD AND COMPOSITION FOR PRIMING WOOD AND NATURAL FIBRES

This application is the U.S. national phase of International Application No. PCT/AU2007/000178, filed 20 Feb. 2007, which designated the U.S. and claims priority to Australia Application No. 2006900824, filed 20 Feb. 2006, the entire contents of each of which are hereby incorporated by reference.

FIELD

The present invention relates to a primer composition for wood and wood products to improve their adhesion with adhesives and coatings, to a method of priming wood and wood products and coating systems and methods for their application. The invention further provides primer composition and method of priming natural polymer fibres to enhance their interaction with polymer matrix in polymer composites.

BACKGROUND

The majority of commercially important hardwoods are notoriously difficult to bond. Poor adhesion of wood, especially hardwood, with adhesives and coatings is the major challenge for the acceptance of numerous timber species by wood product manufacturers.

It is commonly thought that the key reasons for poor adhesion of hardwoods and some softwoods are: interference of extractives and moisture, absence of durable chemical bonds between structural constituents of wood and adhesives or paints, and poor interlocking of adhesive with cell cavities. After machining, extractives rapidly migrate to the wood surface, creating a weak boundary layer which can seriously hinder adhesion. Deposits of extractives on the surface are thought to have the following adverse effects:

- blocking the surface reactive sites;
- incompatibility between the extractives and adhesives resulting in inferior bonding and hindering the cure of adhesives;
- hindering surface wettability so that the surface wetting and/or penetration of particular adhesives into cellular structure of wood is adversely affected.

Migration of extractives onto the wood surface also poses technical and logistic challenges to the wood product manufacturers, requiring wood product components to be freshly prepared and glued or coated quickly after machining.

Poor interfacial adhesion at the interface between the polymer and natural fibres in polymer composites is another problem due to the lack of adequate adhesion between the polymer matrix and the natural polymer fillers in form of fibre, chip or flour. This is often translating into poor performance of polymer-natural fibres composite and limiting its application.

Primer compositions and surface treatments are widely used to improve the bonding of coatings and adhesives with wood or wood products. They are used to provide good adhesion to the substrate surface, and in particular provide a satisfactory bond between the surface and the coating or adhesive and provide satisfactory surface stability until application of the coating or adhesive. Examples of commonly used primers include compositions based on marine or vegetable oils; alkyds and modified alkyds such as vinyl toluenated alkyds, styrenated alkyds, urethane alkyds, polyesters; cellulosic derivatives such as ethyl cellulose, nitrocellulose, cellulose acetobutyrate and modifications such as cellulose acrylics, cellulose alkyds and cellulose polyurethanes. Urethane series resin, melamine series resin and polyester series resin or lacquer is also used.

Latex type primers are also commonly used but in order to obtain the necessary durability and attractive appearance for exterior applications, it is recommended that the latex based primer be coated with two additional layers of latex paint. The latex primer improves adhesion to the substrate and helps to insure a uniform appearance of the top coat. Latex primers must be top coated because they are frequently discoloured by the tannins contained in the substrate. The latex primers function by letting the tannins migrate into the primer and then trapping the tannins within the primer layer. This prevents subsequent latex layers from being discoloured by the tannins. The additional layers of latex paint provide the durability to withstand weathering and provide a uniform, attractive appearance to the resulting coated substrate.

Primer composition and surface treatment method are often used to natural polymer fillers in form of fibre, chip or flour to improve the interfacial adhesion of the polymer composite and hence to improve their mechanical performance. Examples included dispersion or solution of maleated polypropylene and acrylic acid copolymers.

Paints or coatings are commonly used on wood products to prevent UV degradation or rotting or to provide an attractive surface finish. Surfaces of dry wood and wood-based products are, in general, electrically non-conductive so electrostatic painting or coating method is not applicable to them. Powder coating, using solvent-free solid resin, also requires conductive or semi-conductive surface and can not be applied to coat dry wood or wood-based products. Paints or coatings in the form of dispersion or solution are generally applied onto wood or wood-based products using traditional wet-spray method. Significant amounts of paint and coatings are wasted whilst using this method, especially for complex shape articles where uniform coating across the surfaces of interest is difficult to achieve. Electrostatic coating or powder coating using solvent free resin have advantages over traditional coating methods. Up to 80% less solvent-based paint or coating may be used in electrostatic painting process, while near-zero percentage of waste can be achieved whilst using powder coating process. Consequently, application of electrostatic painting or powder coating process can significantly reduce the VOC emissions and consequently help with the effective protection of environment.

Primer composition and treatment method capable of providing conductive or semi-conductive surface to wood or wood-based products to effectively facilitate the electrostatic painting or powder coating methods to these products would be advantageous to industry as a consequence of improving product quality, improving coating transfer efficiency as well as making the process more cost-effective and environment-friendly.

There is a need for a primer composition for improving the adhesion between a wood-based article and various materials such as coating materials and adhesives.

It is a further objective of the invention to provide a primer composition capable of providing the surface of wood or wood-based articles with good adhesion to adhesives or coatings. It would also be an advantage to have a primer capable of rendering wood conductive or semi-conductive to enable electrostatic painting or powder coating processes to be used with such articles.

SUMMARY

We have found that excellent bonding of wood-based articles to adhesives and coatings is provided by priming the article with a waterborne composition comprising a polyamine and having a pH of at least 11.5, preferably at least 12.0 and most preferably at least 12.5. Such a composition can be obtained by mixing a polyamine and a strong inorganic and/or organic base in water. The primed wood-based articles were also found to possess a much improved bondability after primed and stored. Furthermore the primed wood surface was found to unexpectedly exhibit improved electrical conductivity. Wood articles primed according to the invention are suitable for electrostatic powder coating with solvent-free resins, with the efficiency of coating transfer in such electrostatic painting being significantly improved.

Accordingly in a first aspect of the invention we provide a primer composition for wood comprising a waterborne composition comprising polyamine and having a pH of at least 11.5, preferably at least 12.0 and most preferably at least 12.5.

In a second aspect the invention provides a method for improving the bonding of a coating or adhesive to an article comprising a wood surface comprising applying to the at least part of the wood surface a waterborne composition comprising a polyamine and having a pH of at least 11.5 preferably at least 12 and most preferably at least 12.5.

In a further aspect the invention provides an organic cross linker and/or inorganic and/or organic functional material to the primer composition to enhance surface properties such as hardness, scratch resistance, fire retardancy, and/or other properties of the surface and sub-surface of the primed object or material.

In a further aspect the invention provides a waterborne composition comprising a polyamine and having a pH of at least 11.5 preferably at least 12 and most preferably at least 12.5 for natural fibres to enhance their interaction with polymer matrix in a composite material.

In a further aspect the invention provides a method for natural fibres to enhance their interaction with polymer matrix in a composite material comprising applying to the at least part of the natural fibres surface a waterborne composition comprising a polyamine and having a pH of at least 11.5 preferably at least 12 and most preferably at least 12.5.

DETAILED DESCRIPTION

The primer of this invention is an aqueous based mixture which comprises at least one polyamine and one strong base and has a pH value of at least 11.5.

The polyamine according to this invention is an organic compound containing at least two primary or secondary amine groups. Preferred polyamines comprise at least one compound selected from the group consisting of $C_2$ to $C_{36}$ linear, branched or cyclic compounds containing two or more amine groups; and polymers of a number average molecular weight of from 200 to 3 million containing a multiplicity of amine group. Polymeric polyamine compounds are preferred and typically contain at least 4 amine groups, with at least two (but preferably more) amine groups being primary or secondary amines. The molecular weight of these polymers is between 200 and 3000000.

In a one embodiment of this invention the polyamino polymers can be homopolymers containing the monomers, ethylenimine, allylamine, vinylamine, 4-aminostyrene, aminated acrylate/methacrylate, or as copolymers made from a combination of these monomers or as a copolymers containing at least one of these monomers with any other suitable monomer such ethylene, propylene, acrylate/methacrylate and ethylene oxide. The most preferred polyamines are branched or linear polyethyleneimines of molecular weight in the range of from 200 to 3 million, more preferably from 800 to 2 million and still more preferably from 2000 to two million. Polyethyleneimines are a family of polyamines that are generally water-soluble and function as weak bases. The polyethyleneimines may be branched or linear in nature. Suitable polyethyleneimines of this type are commercially available. For example one range of suitable polyethyleneimines is commercially available under the trade mark LUPASOL from BASF.

The concentration of the various components in the composition according to the invention will depend on the specific application and mode of application of the composition to the wood article or natural polymer fibres. The composition will typically contain from 0.1 to 50% polyamine by weight based on the total weight of the composition, preferably 0.5 to 20% and still more preferably from 0.5 to 10% polyamine.

The composition of the invention has a pH of at least 11.5, preferably at least 12 and most preferably at least 12.5. The polyamines used in accordance with the invention are weak bases having a pH value about 10.5 and the high pH is achieved by addition of one or more of strong base from organic or inorganic compound to the mixture. It is particularly preferred that the composition of the invention contains a hydroxide or carbonate base. The counter ion of the hydroxide or carbonate will typically be a metal or ammonium. Alkali and alkaline earth metal hydroxides and carbonates are more preferred and most preferred are sodium hydroxide, potassium hydroxide and lithium hydroxide and/or sodium or potassium silicate. The examples of the most preferred strong organic hydroxides are tetramethylammonium hydroxide or tetraethylammonium hydroxide. The relatively strong base, in contrast with the polyamine, such as the hydroxide or carbonate is present in an amount in the range of from 0.05% to 50% by weight based on the total weight of the composition and preferably from 0.1 to 10% and most preferably from 0.2% to 5%.

The composition of the invention may be applied to the surface of a wood article or natural fibres by any suitable means such as brush, roller coating, spray, dip coating, curtain coating, draw-coating, printing or the like. The composition will generally be dried on the surface of the wood article or natural fibres and the removal of water and any other solvents may optionally be facilitated by air flow, heat or both. The composition of the invention may be applied to all or part of the primed article, fibre(s) or woven fibre fabric. It may for example be used to prime only that part of the article which needs to be painted or bonded. The rate at which the composition is applied to the surface of wood or natural fibres will depend on the nature of the wood or natural fibres and the concentration of the composition. It is generally preferred that the composition based on polyamine solid content is applied at a rate of 0.01 to 20 $g/m^2$ and preferred at 0.1 to 5 $g/m^2$ and most preferably at 0.2 to 2.5 $g/m^2$.

The primer composition of the invention requires an inorganic or organic strong base to provide a pH of at least 11.5, preferably at least 12.0 and most preferably at least 12.5. The ratio of polyamine to strong base range from 100:1 to 1:100 and preferred from 20:1 to 1:20 and most preferred from 10:1 to 1:10.

The composition of the invention may be essentially free of components other than water, polyamine and strong base. Such a composition provides a relatively inexpensive primer which nonetheless provides a very significant increase in the bond strength of subsequently applied coatings, adhesives or matrix resin in a composite material.

In an alternative embodiment the composition of the invention may comprise one or more additional components. Examples of such materials include stain-blocking agents, thickeners, resins latex components, wetting agents, ionic or non ionic surfactants, pigments, fillers, silicates, specialty functional materials such as fire retardants, biocides, preservatives, UV-absorbers and the like. A typical useful additive is silicate with sodium or potassium hydroxide commonly known as sodium- or potassium silicate.

Crosslinkers may be used in this invention to provide a crosslinked network when polyamino modifying agents are used. Crosslinkers are defined as compounds or polymers that contain at least two functional groups with at least one of these groups capable of reacting with the amino groups of the polyamino compounds so that a stable bond is formed between the polyamino compound and the crosslinker. The other functional group on the crosslinker should be able to join at least two polyamino molecules by either reacting with the amino group of another polyamino molecule or by bond formation with the functional group of another crosslinker molecule or by reaction with a co-crosslinking compound which is defined as a compound capable of bond formation with at least two crosslinking molecules. Functional groups which are suitable for initial reaction with the polyamino group include but are not limited to epoxides, anhydrides, acid chlorides, sulfonyl chlorides, ketones, aldehydes, carboxylic acids, esters, isocyanates, vinyl groups susceptible to Michael addition reactions such as acrylate, methacrylate, acrylamide, alkyl halides, alkynes etc. The other functional group, which is responsible for the final crosslinking step can be silanes, epoxides, anhydrides, acid chlorides, sulfonyl chlorides, ketones, aldehydes, carboxylic acids, isocyanates, acrylate or methacrylate esters, alkyl halides etc. Preferable crosslinker are water soluble compounds or water dispersion of epoxy, isocyanates and acrylate.

Preferably the mass ratio of polyamino compound to crosslinker is 100:1 to 1:100 with about 10:1 to 1:10 being preferred.

The type and combination of functional groups on the crosslinker is important because the crosslinker used should enable crosslinking to take place at the surface of the polymeric substrate and minimise crosslinking before application. Examples of suitable crosslinking agents are described in U.S. Pat. No. 6,830,784 patent.

It is generally preferred that the composition is essentially free of crosslinker.

Examples of wood stain-blocking agents include calcium phosphosilicate, and water-soluble basic aluminium halides. Aluminium halides are preferred. The above-described stain-blocking agents and others hereinafter described are all water-soluble and are compatible with water-based primer formulations. Upon application to a "staining" wood as a simple aqueous solution or incorporated into a pigmented or unpigmented paint primer emulsion and dried on the wood, these compounds are no longer water-soluble.

The wood-based, or composite articles primed in accordance with the invention may for example be in the form of particles, sheet, plate, board or a shaped article. The preferred application of the invention is for wood or wood-based products in which at least a part of the surface is required to exhibit improved bonding with adhesives, coatings or other polymeric materials, including polymers and polymer blends. Timber products in such form as solid lumber, planks, posts, boards such as plywood, medium-density or high-density boards, particleboards, chip-boards and oriented strand boards as well as veneer or laminated products for building, furniture, boating industries which fall within the scope of such preferred applications. The invention may also be used to treat wood-based fillers such as wood fibres, chips, flour or other natural wood products used for polymer wood composite or polymer natural fibres composites.

Pre-cleaning or machining by sanding or planning may take place prior to the priming in accordance with the invention to provide suitable base finishing, remove surface contamination or remove a weak boundary layer to provide improved adhesion.

The preferred wood-based materials and other natural fibres for priming using the method of the invention are preferably selected from perennial plants such as softwoods, hardwoods, leaf (hard) woods such as abaca, cantala, caroa, henequen, istle (generic), Mauritius, *phormium*, bowstring hemp, and sisal; Bast (soft), China jute; flax, hemp, jute, kenaf, ramie, roselle, sunn and Cardillo; and softwood kraft. Preferred wood species suitable to the invention include, but are not by any means limited to species such as: Spotted Gum (*Corymbia maculata*), Sugar Gum (*Eucalyptus cladocalyx*), Blackbutt (*Eucalyptus pilularis*), Jarrah (*Eucalyptus marginata*), Blue Gum (*Eucalyptus globulus*), Karri (*Eucalyptus diversicolor*), Paulownia (*Paulownia* Sp), Messmate (*Eucalyptus obliqua*), Mountain Ash (*Eucalyptus regnans*), Pine (*Pinus radiata*), Flooded Gum/Rose Gum (*Eucalyptus grandis*), Silky Oak (*Grevillea robusta*), Meranti (*Shorea* spp), Teak (*Tectona grandis*), Red Cedar (*Toona ciliata*), Merbau (*Intsia* spp.), Chinese rubber wood (*Hevea brasiliensis*). The method of the invention may also be used with other types of wood-based materials such as, but not limited to: composites, wood-based boards such as plywood, medium-density or high-density boards, particleboards, chip-boards and oriented strand boards, wood laminates with other materials such as metals or polymers, as well as starch-, cellulose- or gluten-based materials and the like.

The method of the invention may be used to prime wood-based materials for subsequent application of a wide range of coatings or adhesives. The subsequently applied coating may for example be based on any of vegetable oils; alkyds and modified alkyds such as vinyl toluenated alkyds, styrenated alkyds, urethane alkyds, polyesters; cellulosic derivatives such as ethyl cellulose, nitrocellulose, cellulose acetobutyrate and modifications such as cellulose acrylics, cellulose alkyds and cellulose polyurethanes. Acrylic resins, urethane series resin, melamine series resin and polyester series resin or lacquer and any of their blends may also be used. The resin suitable for use with the process of the invention can be in solid form or diluted in adequate solvent or in dispersion form.

We have unexpectedly found that the primer significantly reduces the electrical resistivity of a wood surface. The reduction in resistivity is such as to make the primer particularly suited to electrostatically applied coating preparations.

The method and primer composition of the invention is thus particularly suited to use in priming wood for coating by an electrostatic process particularly electrostatic-spray process and still more preferably an electrostatic-spray process for powder coating. In the preferred electrostatic-spray process coating powder is dispersed in an air stream and passed through a high voltage field where the particles pick up an electrical charge. The charged particles are attracted and deposited on the primed wood.

It is particularly preferred that the coating applied to the primed wood surface is a powder coating. The coating may be a thermoplastic coating or thermoset coating. Coating compositions of epoxy, polyester and acrylics are particularly preferred.

The coating process may involve heating the coating resin applied to surface of wood or wood based product above the melting point of the powder resin for instance in an oven to cause the powder to melt or cure to form a continuous coating and provide required surface finishing. Curing of the powder resin may also be assisted by IR, UV or electron beam.

Where the primer is used to prepare wood articles for improved adhesion suitable adhesives may be selected from the wide range of adhesives known in the industry including polyurethanes, isocyanates, urea formaldehydes, phenolic, epoxy, acrylics, cyanoacrylates, unsaturated polyesters, PVA's, silicones, and hot-melt adhesives primarily based on polyethylenes, polypropylenes, polyamides and the like. All of these can be used on their own or in the form of mixtures, hybrids or blends with other polymers or blends and/or various functional additives, fillers and the like.

Where the primer is used to treat wood-based fillers in the form of fibres, chips or flour or other natural polymer fibres to improve the interfacial adhesion for polymer composite, it is applicable to thermoset or thermoplastic polymeric matrix and the thermoset or thermoplastic polymeric materials can be either rigid or elastomeric polymers. Preferred polymer matrices are resins or blends of resins selected from, but not limited to the following types: acrylic resins, urethane series resins, epoxy resins, phenolic resins, urea fromaldehydes series resins, melamine series resins and polyester series resins. The suitable polymer matrix for wood-polymer composites according to the invention also includes thermal plastics such as PVC, polyolefins including polypropylene, polyethylene, polyester, polyamide. Interfacial compatiblizers such as maleated polypropylene, maleated polyethylene, copolymer of ethylene with acrylic acid, glycidyl(meth)acrylate, acrylate ester are preferably added to when wood polyolefins composites are prepared.

The invention will now be described with reference to the following examples. It is to be understood that the examples are provided by way of illustration of the invention and that they are in no way limiting to the scope of the invention.

EXAMPLES

The following procedure was adopted to examine the effectiveness of bonding of coatings and adhesives to wood primed in accordance with the method and composition of the invention.

Hardwood and softwood specimens of species selected from Blackbutt (*Eucalyptus pilularis*), Blue gum (*Eucalyptus globulus*), Sugar Gum (*Eucalyptus cladocalyx*) and Spotted Gum (*Corymbia maculata*), Mountain Ash, Radiata Pine were planned and pre-cut into 13.5×13.5×50 mm pieces then stored in conditioned room at 23° C. and 65% humidity for at least one week. Specimens were sanded prior to surface treatment by a two-step sanding process consisting of coarse sanding using an 80-grit sanding paper followed by fine sanding with a 150-grit sanding paper.

Surface treatment was carried out by spraying an aqueous solution comprising a mixture of polyethyleneimine and a base onto the surface of a sanded or planed timber.

The above solution of chemicals was sprayed onto specimens placed on a moving conveyor belt on the laboratory treatment line, or otherwise sparsely brushed straight onto the wood surface using a commodity paint brush.

The distance between the treated timber surface and the tip of spray nozzle was pre-set to 80 mm with the spraying fan covering a width of 80 mm. Conveyor speed was simultaneously adjusted to an appropriate velocity [m/min] to maintain the Standardised Flow Rate Parameter, SFRP, [ml/m] at a constant level (flow rate through the spray nozzle/conveyor speed). Specimens sprayed with aqueous solution were allowed to dry in air at room temperature. Adhesive bonding was subsequently carried out within the time-span of 1 to 4 hours after completion of treatment, unless otherwise specified.

Two types of adhesives manufactured by Bostik (AV Syntech) Australia were used in our experiments: single-part moisture cured polyurethane adhesive, AV 515 and a two-part high strength urea formaldehyde adhesive AV 203. Both adhesives were applied to the wood surface and cured according to the manufacturer's recommendation.

Polyethyleneimines (PEI) Lupasol FG (Mw 800), G35 (Mw 2,000), G100 (Mw 5,000), WF (Mw 25,000), PS (Mw 750,000) and SK (2,000,000) were obtained as a sample from BASF.

Adhesive was applied onto the treated surface, and two surface-treated pieces of timber were then assembled into a glued specimen in a cross-lap configuration. Subsequent to this, bonded specimens were placed in a custom-designed gluing jig designed to provide adjustable clamping pressure, as recommended by the adhesive's manufacturer. A constant pressure adjusted to 0.6 MPa was applied to the glued assemblies placed in the jig. Subsequently, the jig holding clamped specimens was transferred to a conditioning room (temperature=23° C., and RH=62%).

All adhesion tests were carried out after adhesive was completely cured for 72 hours under the above conditions.

An in-house exposure protocol employing creep loading under constant tensile stress applied to the glue line was used to assess the bond strength and durability of bonded specimens.

The above protocol involves exposure to a constant load and condensing humidity at 60° C. for 24 h. All bonded specimens are consequently subjected to a severe hydro-thermal stress simulating real-life exposure of bonded components to a permanent engineering stress in a high humidity and high-temperature environment. The load level applied to specimens in the rig is incrementally raised in the time-spans of 24 hours until the failure of a loaded sample (de-bonding, or wood failure) is observed during a 24-hour cycle. If the loaded specimen survives this exposure, it is removed, and a new assembly is placed in the rig under increased stress level to obtain the true value of the bond strength.

Tensile strength of bonded assemblies was determined from the above test.

Example 1

Blackbutt specimens were sanded and surface treated as follows:
  1. Control (Sanded only)
  2. Sprayed with 1.0% NaOH
  3. Sprayed with 1.25% NaOH
  4. Sprayed with 2.0% NaOH
  5. Sprayed with 2.5% G35
  6. Sprayed with mixture of 2.5% G35+1.25% NaOH
  7. Sprayed with 2.0% G100
  8. Sprayed with mixture of 2.0% G100+1.25% NaOH
  9. Sprayed with 2.5% G100
  10. Sprayed with mixture of 2.5% G100+1.25% NaOH
  11. Sprayed with 2.0% WF
  12. Sprayed with mixture of 2.0% WF+1.5% NaOH The flow rate of treating solution was 3.3 ml/m. Specimens were bonded with polyurethane adhesive, cured and tested according to the procedure described above. The bond strengths expressed as tensile strengths of bonded specimens are summarised in the Table 1.

TABLE 1

| | Formulation/Treatment | Bonding Strength (MPa) | Improvement Over control |
|---|---|---|---|
| 1. | Control (sanded only) | 0.5 | — |
| 2. | 1.0% NaOH | 0.35 | −30% |
| 3. | 1.25% NaOH | 0.22 | −56% |
| 4. | 2.0% NaOH | 0.2 | −60% |
| 5. | 2.5% G35 | 0.47 | −6% |
| 6. | 2.5% G35 + 1.25% NaOH | 1.05 | +110% |
| 7. | 2.0% G100 | 0.52 | +4% |
| 8. | 2.0% G100 + 1.25% NaOH | 1.75 | +250% |
| 9. | 2.5% G100 | 0.5 | 0 |
| 10. | 2.5% G100 + 1.25% NaOH | 1.75 | +250% |
| 11. | 2.0% WF | 0.55 | +10% |
| 12. | 2.0% WF + 1.5% NaOH | 1.23 | +146% |

This example demonstrates that the treatment with a base (sodium hydroxide) alone does not improve the bond strength of Blackbutt with polyurethane adhesive. In fact the treatment with NaOH alone has a detrimental effect on adhesion. Improvement of bonding strength with polyethyleneimine alone is not significant and falls within the range of standard deviation associated with experiments. However the combination of sodium hydroxide with PEI G100 gives a significant improvement of the bond strength up to 250%.

Example 2

Specimens of various species of Australian timbers such as: Sugar Gum, Blackbutt, Blue Gum, Spotted Gum, Mountain Ash and Radiata Pine were sanded and surface sprayed at a flow rate of 3.3 ml/m with a mixture of polyethyleneimine with sodium hydroxide and bonded with a polyurethane adhesive (see below for details of treatments). The results of tensile strength obtained from the above described creep testing under condensing humidity at 60° C. are compared to the sanded only specimens (control sample), and are summarised in Table 2.
Surface treatment details:
 Sugar Gum: mixture of 2.0% G35+1.5% NaOH
 Blue Gum: mixture of 2.0% WF+1.5% NaOH
 Spotted Gum: mixture of 2.0% G100+0.5% NaOH
 Blackbutt: mixture of 2.5% G100+1.25% NaOH
 Mountain Ash: mixture of 2.0% SK+1.25% NaOH
 Radiata Pine: mixture of 2.0% G100+1.25% NaOH

TABLE 2

| Wood | Formulation/Treatment | Bonding Strength (MPa) | Improvement |
|---|---|---|---|
| Sugar Gum | None (sanded only) | 0.19 | — |
| Sugar Gum | 2.0% G35 + 1.5% NaOH | 1.04 | +447% |
| Blue Gum | None (sanded only) | 0.5 | — |
| Blue Gum | 2.0% WF + 1.5% NaOH | 1.52 | +224% |
| Spotted Gum | None (sanded only) | 0.39 | — |
| Spotted Gum | 2.0% G100 + 0.5% NaOH | 1.32 | +238% |
| Blackbutt | None (sanded only) | 0.5 | — |
| Blackbutt | 2.5% G100 + 1.25% NaOH | 1.75 | +250% |
| Mountain Ash | None (sanded only) | 0.23 | — |
| Mountain Ash | 2.0% SK + 1.25% NaOH | 1.26 | +448% |
| Radiata Pine | None (sanded only) | 0.61 | — |
| Radiata Pine | 2.0% G100 + 1.25% NaOH | 1.20 | +97& |

The results in Table 2 demonstrate that the treatment process is effective in improving the adhesion of a wide range of hardwoods and soft wood, with highest improvement of bond strength achieved on the most difficult to bond Australian hardwood, i.e. Sugar Gum.

Example 3

Blackbutt was sanded and surface sprayed at a flow rate of 3.3 ml/m with a mixture of polyethyleneimine G100 with various inorganic (such as sodium hydroxide, potassium hydroxide, lithium hydroxide) and organic bases (such as tetramethylammonium hydroxide (TMAH), tetraethylammonium hydroxide (TEAH) and bonded with a polyurethane adhesive (see below for details of treatments). The results of tensile strength obtained from the above described creep testing under condensing humidity at 60° C. are compared to the sanded only specimens (control sample), and are summarised in Table 3.
Surface Treatment Details:
 1. Control (sanded only)
 2. mixture of 2.0% G100+1.25% NaOH
 3. mixture of 2.0% G100+1.5% KOH
 4. mixture of 2.0% G100+2.0% LiOH
 5. mixture of 2.0% G100+1.5% TMAH
 6. mixture of 2.0% G100+2.0% TEAH

TABLE 3

| Treatment | Tensile strength MPa | Improvement over Control |
|---|---|---|
| 1. Control (sanded only) | 0.5 | — |
| 2. 2.0% G100 + 1.25% NaOH | 1.75 | +250% |
| 3. 2.0% G100 + 1.5% KOH | 1.36 | +172% |
| 4. 2.0% G100 + 2.0% LiOH | 0.94 | +88% |
| 5. 2.0% G100 + 1.5% TMAH | 1.66 | +232% |
| 6. 2.0% G100 + 2.0% TEAH | 1.22 | +144% |

The results in Table 3 demonstrate that the treatment process is effective in improving the adhesion of wood, when polyamine was mixed with a wide range of strong bases selected from inorganic or organic.

Example 4

In this example Blackbutt was sanded and surface sprayed at a flow rate of 3.3 ml/m with a mixture of polyethyleneimine of various molecular weight and sodium hydroxide and bonded with a polyurethane adhesive (see below for details of treatments). The results of tensile strength obtained from the above described creep testing under condensing humidity at 60° C. are compared to the sanded only specimens (control sample), and are summarised in Table 4.
Surface Treatment Details:
 1. Control (sanded only)
 2. mixture of 2.0% FG+1.25% NaOH
 3. mixture of 2.0% G35+1.5% NaOH
 4. mixture of 2.0% G100+1.25% NaOH
 5. mixture of 2.0% WF+1.5% NaOH
 6. mixture of 2.0% SK+2.0% NaOH

TABLE 4

| Treatment | Bonding strength (MPa) | Improvement over Control |
|---|---|---|
| 1. Control (sanded only) | 0.5 | — |
| 2. 2.0% FG + 1.25% NaOH | 1.0 | +100% |
| 3. 2.0% G35 + 1.5% NaOH | 1.13 | +126% |
| 4. 2.0% G100 + 1.25% NaOH | 1.75 | +250% |
| 5. 2.0% WF + 1.5% NaOH | 0.96 | +92% |
| 6. 2.0% SK + 2.0% NaOH | 0.9 | +80% |

The results in Table 4 demonstrate that the primer formed by mixing sodium hydroxide with polyamine of molecular weight varying from 800 to 2 million is effective in improving the adhesion of wood, indicating that a wide range of molecular weight of polyamine is applicable to this invention.

Example 5

In this example the pH value of various formulation of primers according to this invention were measured and summarized in Table 5. Deionised water with resistance better than 1 MΩ was used for the preparation of all the formulations. The adhesion results of Blackbutt treated with these formulations and bonded with polyurethane adhesive were also given in the table. Blackbutt was sanded and surface sprayed at a flow rate of 3.3 ml/m with these formulations (see below for details of treatments). The results of tensile strength obtained from the above described creep testing under condensing humidity at 60° C. are also summarised in Table 5.

Surface Treatment Details:
1. Control (sanded only)
2. 0.05% NaOH
3. 2.0% G100
4. mixture of 2.0% G100+0.5% NaOH
5. mixture of 2.0% G100+0.5% TMAH
6. mixture of 2.0% G100+1.25% NaOH
7. mixture of 2.0% G100+3.0% NaOH
8. mixture of 2.0% G100+4.0% NaOH
9. 2.0% WF
10. mixture of 2.0% WF+0.25% NaOH

TABLE 5

| Formulation/Treatment | pH Value | Bonding Strength (MPa) | Improvement Over control |
|---|---|---|---|
| 1. Control (sanded only) | — | 0.5 | |
| 2. 0.05% NaOH | 11.5 | | |
| 3. 2% of G100 | 10.2 | 0.52 | +4% |
| 4. 2.0% G100 + 0.5% NaOH | 12.9 | 0.83 | +66% |
| 5. 2.0% G100 + 0.5% THMA | 12.5 | 1.39 | +178% |
| 6. 2.0% G100 + 1.25% NaOH | 13.4 | 1.75 | +250% |
| 7. 2.0% G100 + 3.0% NaOH | 13.7 | 1.05 | +110% |
| 8. 2.0% G100 + 4.0% NaOH | 13.8 | 1.16 | +132% |
| 9. 2.0% WF | 10.7 | 0.55 | +10% |
| 10. 2.0% WF + 0.25% NaOH | 12.7 | 0.88 | +76% |

The results in Table 5 demonstrate that the aqueous solution of a polyethyleimine is a weak base with the pH value around 10.5 and that treatment of wood with polyethyleneimine alone does not lead to any significant improvement of the bond strength. It is also demonstrated through the data presented in Table 5 that the addition of a strong organic or inorganic base increased the basicity of the primer composition, and that the mixture of polyethyleneimine with strong base significantly increases the strength of the bond of adhesively bonded wood structure.

Example 6

In this example Blackbutt was sanded and surface treated by spraying at the flow rate of 3.3 ml/m using a mixture of polyamine and base (see details below) and bonded with structural polyurethane (PU) or high strength urea formaldehyde (UF) adhesive and subsequently tested according to the method described earlier in the text. The results obtained are compared to the control (sanded only specimens) and summarised in Table 6.

Surface Treatment Details:
Bonded with UF: 2.0% FG+1.5% NaOH
Bonded with PU: 2.5% G100+01.25% NaOH

TABLE 6

| Adhesive | Urea formaldehyde (UF) | polyurethane (PU) |
|---|---|---|
| Control | 0.38 | 0.5 |
| Surface Treated | 1.29 | 1.75 |
| Improvement | +239% | +250% |

The results in this example clearly demonstrate that the invention is also very effective to improve the adhesion of hardwoods when different adhesives are used.

Example 7

In this example, wood specimens of Blackbutt were prepared by either: planning or sanding and when required, sprayed at the flow rate of 3.3 ml/m with a mixture of polyamine and base (see details below). The specimens were then bonded with polyurethane adhesive and tested. Results obtained are compared to the controls and summarised in Table 7.

Surface Preparation and Treatment Details:
i) Planned, then sprayed with mixture of 2.0% G100+ 1.25% NaOH
ii) Sanded, then sprayed with mixture of 2.0% G100+ 1.25% NaOH

TABLE 7

| Method of preparation | Planning | Sanding |
|---|---|---|
| Control | 0.39 | 0.5 |
| Surface treated | 1.14 | 1.75 |
| Improvement | 192% | 250% |

Significant improvement of bond strength of wood prepared by either, sanding or planning is demonstrated in this example, indicating that the primer and the process of the invention are applicable to various machining methods used to wood article preparation prior to surface priming.

Example 8

In this example, Blackbutt specimens were sanded and hand brushed or sprayed with a mixture of polyethyleneimine G100 and sodium hydroxide and bonded with PU adhesive. The results summarised in Table 8 present bond strengths obtained subsequent to the exposure of bonded specimens to the earlier described creep testing under condensing humidity at 60° C. The results achieved are compared to the controls.

Surface treatment details:
Mixture 1: 2.0% G100+1.25% NaOH
Mixture 2: 2.5% G100+1.25% NaOH

TABLE 8

| Treatment | Hand brush | Spray |
|---|---|---|
| Control | 0.5 | 0.5 |
| Mixture 1: 2.0% G100 + 1.0% NaOH | 1.40 | 1.62 |
| Improvement | 180% | 224% |
| Mixture 2: 2.5% G100 + 1.0% NaOH | 1.26 | 1.75 |
| Improvement | 152% | 250% |

This example demonstrates an easy and simple application of the invention by either, spray-, or brush-applied the primer composition to improve bond strength of hardwoods with structural adhesive.

Example 9

In this example, Blackbutt specimens were sanded and sprayed with a mixture of polyethyleneimine G100 with sodium hydroxide and bonded with PU adhesive. Surface-primed specimens were then stored in the conditioning room at 23° C. and relative humidity of 62% for a pre-set duration of time and then bonded with polyurethane adhesive. Adhesion test was carried out as described above and results of the bonding strength are summarized in Table 9
Surface Treatment Details:
1. Control 1 (sanded only and bonded on the same day)
2. Control 2 (sanded only and stored 30 days)
3. 2.0% G100+1.25% NaOH, bonded after on the same day
4. 2.0% G100+1.25% NaOH, bonded after 14 days
5. 2.0% G100+1.25% NaOH, bonded after 30 days

TABLE 9

| Treatment | Tensile strength MPa | Improvement over Control |
| --- | --- | --- |
| 1. Control 1, sanded only and bonded on the same day | 0.5 | — |
| 2. Control 2, sanded only and stored 30 days | 0.2 | −60% |
| 3. 2.0% G100 + 1.25% NaOH, bonded after sanding on the same day | 1.75 | +250% |
| 4. 2.0% G100 + 1.25% NaOH, bonded after 14 days | 1.18 | +136% |
| 5. 2.0% G100 + 1.25% NaOH, bonded after 30 days | 1.20 | +140% |

This example demonstrates that although some reduction of the bond strength occurred during storage of primed wood specimens for up to 30 days, the observed improvement of the strength of adhesive bond is still 100% higher than that of the freshly sanded and immediately bonded control, and 500% higher than the strength of the bond exhibited by the sanded and consequently stored for 30 days unprimed control. The bond strength for sanded only samples is shown to have deteriorated by more than 60% after 30 days of storage under the same conditions. The above demonstrated gains are very useful for industrial applications, when timber products or sub-components need to be manufactured and surface-treated in one place and then transported to another place for subsequent bonding and assembly.

Example 10

In this example, Blackbutt specimens were sanded and sprayed at the flow rate of 3.3 ml/m with a mixture of polyethyleneimine of various concentrations with a strong base (see details below). The specimens were then bonded with polyurethane adhesive and tested. Results obtained are compared to the controls and summarised in Table 10.
The Treatment Details are:
1. Control (sanded only)
2. 2% of G100
3. 1.0% WF+0.75% NaOH
4. 1.5% G100+0.5% THMA
5. 2.0% G100+1.25% NaOH
6. 3.0% G100+3.0% NaOH
7. 4.0% G100+1.25% NaOH

TABLE 10

| Formulation/Treatment | Bonding Strength (MPa) | Improvement Over control |
| --- | --- | --- |
| 1. Control (sanded only) | 0.5 | |
| 2. 2% of G100 | 0.52 | +4% |
| 3. 1.0% WF + 0.75% NaOH | 0.87 | +74% |
| 4. 1.5% G100 + 0.5% THMA | 1.00 | +100% |
| 5. 2.0% G100 + 1.25% NaOH | 1.75 | +250% |
| 6. 3.0% G100 + 3.0% NaOH | 1.36 | +172% |
| 7. 4.0% G100 + 1.25% NaOH | 1.12 | +124% |

This example demonstrates that over a wide range of polyethyleneimine concentration, significant improvement of adhesion was obtained on wood surface modified according to the invention.

Example 11

In this example Blackbutt and Spotted Gum were cut into 80×80×3 mm pieces and were then sanded and subsequently sprayed at 3.3 ml/min with a mixture of polyethyleneimine and sodium hydroxide with the treatment details specified below. The specimens were dried in ambient air at room temperature for one hour, and then surface resistance of their surface was measured with a Keithley resistivity meter Model 8009 couple with Keithley potentiometer.
Details of Treatments are:
1. Blackbutt/Control (sanded only)
2. Blackbutt sprayed with mixture of 2% G100+1.25% NaOH
3. Blackbutt sprayed with mixture of 2% WF+1.25% NaOH
4. Spotted Gum/Control (sanded only)
5. Spotted Gum sprayed with mixture of 2% G100+1.25% NaOH
6. Spotted Gum sprayed with mixture of 2% G100+1.25% NaOH

TABLE 11

| Wood | Treatment | Resistivity $\Omega$/square |
| --- | --- | --- |
| Blackbutt | none | $2.3 \times 10^{12}$ |
| Blackbutt | 2% G100 + 1.25% NaOH | $2.6 \times 10^{10}$ |
| Blackbutt | 2% WF + 1.25% NaOH | $4.5 \times 10^{10}$ |
| Spotted Gum | none | $1.0 \times 10^{12}$ |
| Spotted Gum | 2% G100 + 1.25% NaOH | $1.5 \times 10^{10}$ |
| Spotted Gum | 2% WF + 1.25% NaOH | $2.4 \times 10^{10}$ |

The example demonstrates that the surface electrical resistivity was reduced by 2 orders of magnitude (i.e. 100-times) on specimens whose surface has been modified according to the invention, in comparison with the untreated specimens.

Finally, it is understood that various other modifications and/or alterations may be made without departing from the spirit of the present invention as outlined herein.

The invention claimed is:
1. A primer composition for wood or wood products to improve their adhesion with adhesives and coatings, said primer composition consisting essentially of at least one polyamine, at least one strong base and water and having a pH of at least 12.5,
  wherein the at least one polyamine comprises at least one polyethyleneimine of molecular weight in the range of from 500 to 3 million, and the strong base is a hydroxide or carbonate base; and wherein, in use, the primer composition is applied to a surface of a wood or wood product(s) to improve their adhesion with adhesives and coatings.

2. A primer composition according to claim 1, wherein the pH is at least 13.

3. A primer composition according to claim 1, wherein the composition contains in the range of from 0.1 to 50% polyamine by weight based on the total weight of the composition.

4. A primer composition according to claim 1, wherein the counter ion of the hydroxide or carbonate is a metal or quaternary ammonium ion.

5. A primer composition according to claim 1, wherein the strong base comprises at least one strong base selected from alkali and alkaline earth metal hydroxides and carbonates.

6. A primer composition according to claim 1, wherein the composition contains the strong base in a range of from 0.1% to 10% by weight based of a strong base based on the total weight of the composition.

7. A primer composition according to claim 1, wherein the composition comprises at least one further component selected from the group consisting of stain-blocking agents, thickeners, binders, resins latex components, wetting agents, surfactants, pigments, fillers, fire retardants, biocides, preservatives, and UV stabilizers and crosslinker compounds that contain at least two functional groups with at least one of these groups capable of reacting with an amine groups of the polyamine compounds so that a stable bond is formed between the polyamino compound and the crosslinker.

8. A method of improving the bonding of a coating or adhesive to an article comprising a wood surface, said method comprising applying to at least part of the wood surface a primer composition consisting essentially of at least one polyamine, at least one strong base and water and having a pH of at least 12.5, wherein the at least one polyamine comprises at least one polyethyleneimine of molecular weight in the range of from 500 to 3 million, and the strong base is a hydroxide or carbonate base.

9. A method according to claim 8, wherein the pH of the primer composition is at least 13.

10. A method according to claim 8, wherein the polyamine comprises polymers and copolymers having multi amine groups and of molecular weight is between 200 and 3000000.

11. A method according to claim 8, wherein the polyamine comprises at least one compound selected from the group consisting of polyethyleneimines of molecular weight in the range of from 800 to 2 million.

12. A method according to claim 8, wherein the primer composition contains from 0.05 to 50% polyamine by weight based on the total weight of the composition.

13. A method according to claim 8, wherein the counter ion of the hydroxide or carbonate comprises at least one of a metal and ammonium cation.

14. A method according to claim 8, wherein the strong base comprises at least one strong base selected from the group consisting of alkali and alkaline earth metal hydroxides and carbonates.

15. A method according to claim 8, wherein the strong base comprises a strong base in an amount of from 0.1% to 10% by weight based on the total weight of the composition.

16. A method according to claim 8, wherein the primer composition is applied to at least part of the wood surface of article by brush, roller coating, spray, curtain coating, dip coating or the like.

17. A method according to claim 8, wherein the primer composition based on polyamine solid content is applied at a rate of 0.01 to 20 g/m$^2$ and most preferably at a rate of 0.1 to 5 g/m$^2$.

18. A method according to claim 8, wherein the primer composition comprises at least one additional component selected from the group consisting of stain-blocking agents, thickeners, resins latex components wetting agents, surfactants, pigments, fillers, UV stabilisers, fire retardants, biocides and preservatives, and cross linkers containing at least two functional groups with at least one of these groups capable of reacting with the amino groups of the polyamino compounds so that a stable bond is formed between the polyamino compound and the crosslinker.

19. A method according to claim 8, wherein the method further comprises application of a coating or adhesive to at least part of the primed wood surface.

20. A method according to claim 8, wherein the method comprises applying at least one coating selected from the group consisting of coatings based on any of vegetable oils; alkyds and modified alkyds such as vinyl toluenated alkyds, styrenated alkyds, urethane alkyds, polyesters; cellulosic derivatives such as ethyl cellulose, nitrocellulose, cellulose acetobutyrate and modifications such as cellulose acrylics, cellulose alkyds and cellulose polyurethanes and latex coatings based on urethane series resins, melamine series resins and polyester series resins or lacquers.

21. A method according to claim 8, wherein the method further comprises applying to at least a portion of the primed wood surface at least one thermoset or thermoplastic adhesive selected from epoxies, polyurethanes, isocyanates, urea formaldehydes, phenolics, acrylics, PVA's, crosslinked PVA's, polyesters, silicones, hot-melts, cyanoacrylates and hybrids of any of these materials.

22. A method according to claim 8, wherein following application of said primer composition a powder coating is applied by an electrostatic spray process.

* * * * *